United States Patent

[11] 3,583,172

| [72] | Inventors | Robert Edwars Koudelka;<br>Lawrence Lees Kelly, both of Birmingham |
| --- | --- | --- |
| [21] | Appl. No. | 837,931 |
| [22] | Filed | June 30, 1969 |
| [45] | Patented | June 8, 1971 |
| [73] | Assignee | Union Carbide Corporation<br>New York, N.Y. |

[54] CRYOGENIC COOLING OF CONCRETE
7 Claims, No Drawings

[52] U.S. Cl. ..................................................... 62/70,
106/88, 259/147
[51] Int. Cl. ...................................................... C04b 7/36
[50] Field of Search............................................ 259/147,
151; 106/38 X, 86; 249/Consult; 264/28; 62/64,
62, 56, 66, 70, 69; 25/Consult

[56] References Cited
UNITED STATES PATENTS

| 2,261,808 | 11/1941 | Morris......................... | 62/64 |
| --- | --- | --- | --- |
| 2,648,206 | 8/1953 | Carr ............................ | 62/64X |
| 2,909,433 | 10/1959 | Morrison..................... | 99/136 |
| 2,919,862 | 1/1960 | Beike et al................... | 62/64X |
| 3,150,496 | 9/1964 | Hightower ................. | 62/64 |
| 3,410,065 | 11/1968 | Martin......................... | 62/64X |

*Primary Examiner*—William E. Wayner
*Attorneys*—Paul A. Rose, Thomas I. O'Brien, Harrie M. Humphreys and Lawrence G. Kastriner

ABSTRACT: A concrete mixture may be cooled to any desired temperature range specification prior to pouring, by spraying or injecting a cryogenic liquid, such as liquid nitrogen, directly onto or into the concrete mixture while it is being mixed in a conventional rotating mixer.

3,583,172

CRYOGENIC COOLING OF CONCRETE

BACKGROUND

This invention relates in general to cooling of concrete mixtures, and more specifically to a method for cooling concrete mixtures prior to pouring by spraying or injecting a cryogenic liquid, such as liquid nitrogen, into a rotating concrete mixer.

The mixing and pouring of high strength concrete requires adherence to strict specifications as to the pouring temperature. During the warm summer months, as well as in warm climates, the constituents used to produce concrete, i.e. the sand, aggregate, cement and water approach the ambient atmospheric temperature. When these components are mixed together, the temperature of the mixture generally far exceeds the specification for pouring the concrete. High concrete temperature is undesirable because it results in too rapid hydration of the cement. This, in turn, causes decreased handling time, greater mixing water demand, increased evaporation of mixing water, and reduced strength.

The harmful effects of hot weather on concrete have been minimized in the past by various cooling procedures. The most common approach for keeping the temperature of the concrete down has been by controlling the temperature of the mixing water, since pound for pound, the water has a specific heat which is almost five times that of the cement or aggregate. The use of ice as part or all of the mixing water is also commonly used in hot weather to reduce the temperature of the concrete mix, particularly in large construction projects. However, this requires rather substantial capital expenditures on ice plants and mechanical refrigeration units in order to provide sufficient cooling capacity for large concrete pouring projects such as dams which may require the pouring of millions of cubic yards of concrete.

Specifications for high quality concrete work—such as required, for example, by the ATomic Energy Commission for foundations for atomic reactors—require that the pouring temperature of the concrete be maintained between 40° and 65° F. In the summer months, when the addition of 220 pounds of ice per cubic yard of concrete (which is the total water requirement for the concrete mix) does not bring the mix below 65° F., the pouring operation must cease resulting in costly delays in construction. Specifications by the U.S. Army Corps of Engineers for construction of large dams are even more stringent, and require the temperature of the concrete in the dam to be maintained between 40° and 45° F. one hour after being poured.

In view of the above it can be seen that a simple technique which can readily be incorporated into existing concrete construction methods, which requires low capital investment, and which has sufficient cooling capacity to cool a concrete mix to any specific temperature range is highly desirable.

OBJECTS

It is the primary object of the present invention to provide a method for cooling a concrete mixture prior to pouring to a predetermined temperature range which is below ambient atmospheric temperature.

It is another object to provide a method for cooling a concrete mixture to a temperature range between 40° and 65° F.

It is still another object to provide a method for cooling concrete prior to pouring by a simple method which requires low capital investment and which can easily be incorporated into present concrete construction techniques.

SUMMARY OF THE INVENTION

The above and other objects which will become apparent to those skilled in the art from the enclosed specification and claims, are achieved by the present invention which comprises: a method for cooling a concrete mixture contained in a chamber to a predetermined temperature range below ambient atmospheric temperature by discharging a cryogenic liquid into said chamber while mixing said concrete.

DETAILED DESCRIPTION OF THE INVENTION

The preferred method for carrying out the present invention is to discharge the cryogenic liquid by spraying or injecting said liquid directly into a rotating concrete mixing drum in such manner as to spray or impinge the liquid onto the surface of the plastic concrete mix. Such drum may be either a conventional stationary concrete mixer, or a truck-mounted mixer such as is commonly used where the concrete mixture is produced at a central mixing plant and then transferred by mixing truck to the points of usage. Preferably, the cryogenic liquid is added just prior to pouring in order to prevent the ambient temperature from heating the concrete up again after it has been cooled to the desired predetermined temperature range. In order to minimize the use of the cryogenic liquid, the concrete mix can be prepared with prechilled components including chilled water and/or ice. In such case, only the final temperature adjustment need be made with the cryogenic liquid. However, the entire cooling may be accomplished by the use of the cryogenic liquid alone.

The term, "cryogenic liquid," as used throughout this disclosure is intended to mean a substance having its normal boiling point below about −150° F. Illustrative suitable cryogenic liquids include: liquid air, liquid helium, liquid neon, liquid argon and liquid nitrogen. The last is the preferred cryogenic liquid for the present invention and has a normal boiling point of about −320° F.

An alternative method of introducing the cryogenic liquid is by injecting it under the surface of the concrete mix. This method permits greater nitrogen efficiencies to be realized than by spraying liquid onto the mix because it permits recovering much of the sensible heat of the cold cryogenic gas much of which is lost by the surface spraying technique. However, it requires more sophisticated injection devices than spraying.

A series of tests were conducted by piping in a supply of liquid nitrogen from a conventional liquid nitrogen storage vessel through a flexible hose provided with a standard nozzle which was directed into an open port of a rotating truck-mounted concrete mixer. The piping and flexible hose were insulated, and directed manually into the rotating drum so that the liquid nitrogen was sprayed and impinged directly onto the plastic concrete in the rotating mixer. The conditions and quantities of materials used are shown in table I below.

TABLE I

| Run No. | Concrete temperature Before cooling (° F.) | Concrete temperature After cooling (° F.) | Specific nitrogen consumption (ft.³/ yd.³/° F.) | Mixer rotation (r.p.m.) | Nitrogen time (min.) |
|---|---|---|---|---|---|
| 1 | 68 | 64 | 428 | <8 | 7.0 |
| 2 | 64 | 56 | 232 | 8 | 11.5 |
| 3 | 68 | 57 | 156 | 10 | 12.0 |
| 4 | 70 | 60 | 129 | 13 | 9.0 |
| 5 | 65 | 54 | 136 | 14 | 10.0 |
| 6 | 68 | 52 | 134 | 14 | 11.0 |

In each of the tests shown in table I above, the concrete mixing truck held 7 cubic yards (yd³) of concrete. The temperature of the concrete was measured 1 to 2 minutes after nitrogen injection had been stopped. During runs numbered 1 through 4, the ambient atmospheric temperature was 86°—89 ° F., while during runs 5 and 6 it was 92°—95° F. It can be seen that in each case the temperature of the concrete batch was brought below 65° F. within about 10 minutes of liquid nitrogen spraying. The high nitrogen consumption in run number 1 was caused by the slow rotation of the mixer.

Low temperature embrittlement of the carbon steel mixer shell is not a problem since the spray was directed onto the concrete which acts as a refractory lining to protect the shell from the extreme cold of the liquid nitrogen. The liquid nitrogen cools the concrete by its rapid evaporation. Since it turns almost instantly to inert nitrogen gas upon contacting the concrete, it does not effect the concrete mix other than to chill it. Tests on liquid nitrogen cooled concrete samples analyzed after 3, 7 and 28 days showed no loss of compressive strength properties.

It can be seen from the above that the use of liquid nitrogen is highly desirable, since it requires very low capital investment, since the operation is extremely simple to carry out and since it may be done without a significant departure from conventional concrete construction technology.

We claim:

1. A method for cooling a concrete mixture contained in a rotatable mixing chamber to a temperature range between 40°–65° F. comprising: discharging a cryogenic liquid selected from the group consisting of liquid air, liquid helium, liquid neon, liquid argon and liquid nitrogen into said chamber and mixing said concrete by rotation of said chamber.

2. The method of claim 1 wherein said cryogenic liquid is discharged into said chamber so as to impinge onto said concrete mixture.

3. The method of claim 1 wherein said cryogenic liquid is discharged into said chamber so as to be injected under the surface of said concrete mixture.

4. The method of claim 1 wherein the cryogenic liquid is liquid nitrogen.

5. The method of claim 1 wherein said rotatable mixing chamber is mounted on a truck.

6. The method of claim 4 wherein said mixing chamber is rotated at 10 to 14 r.p.m.

7. The method of claim 6 wherein the amount of liquid nitrogen used is about 125 to 150 cubic feet per cubic yard of concrete per degree of cooling to be obtained.